United States Patent Office 2,911,077
Patented Nov. 3, 1959

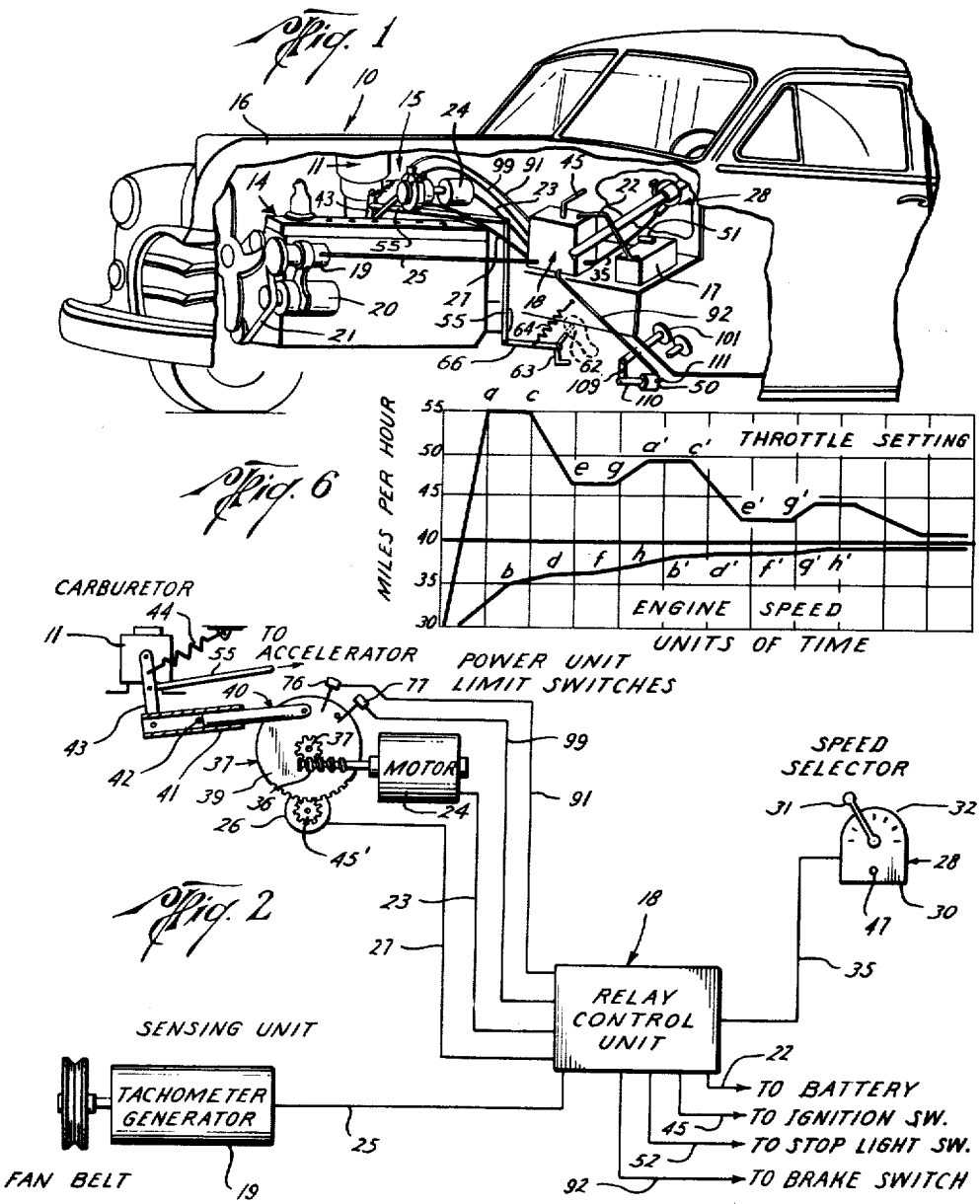

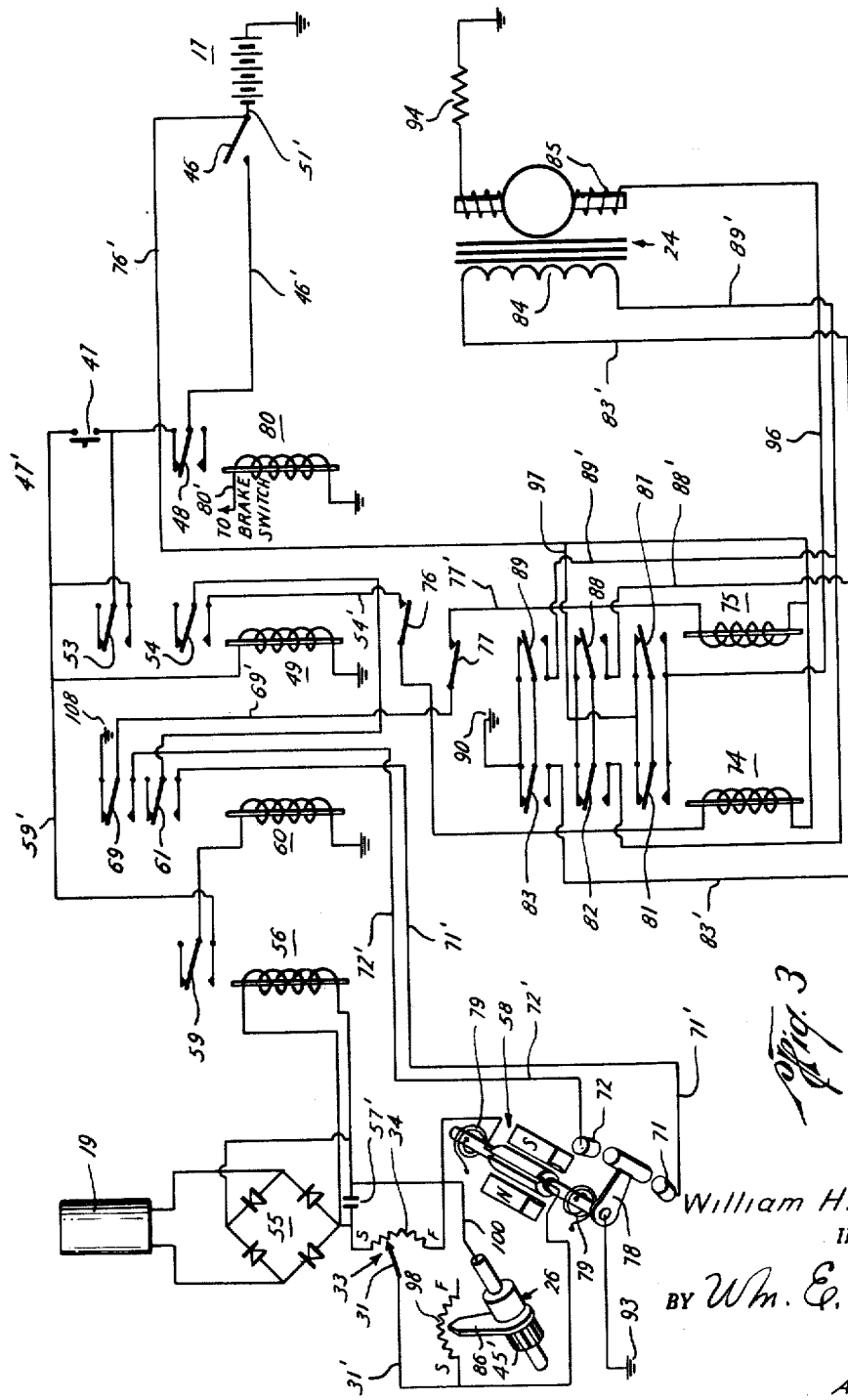

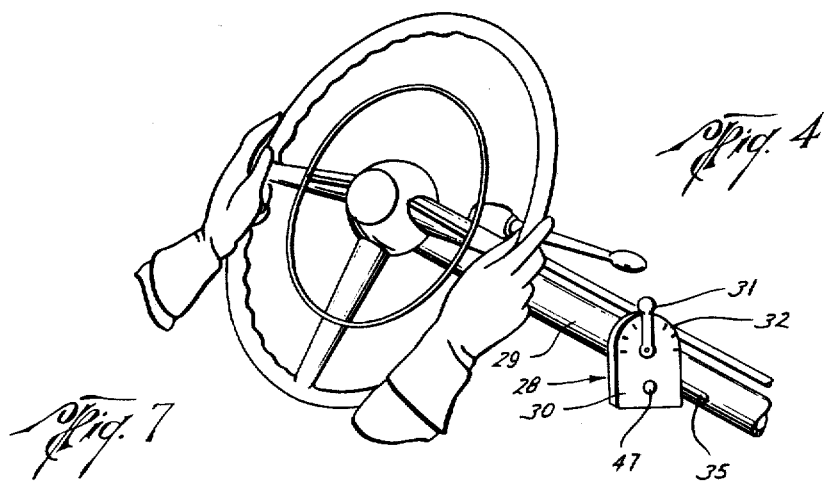
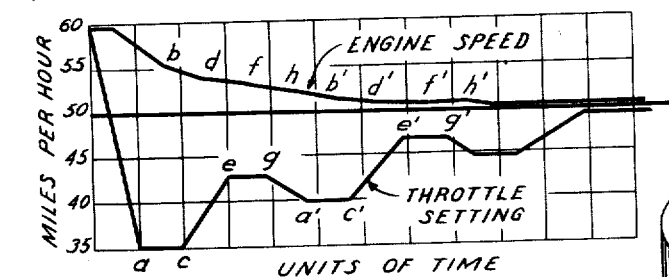
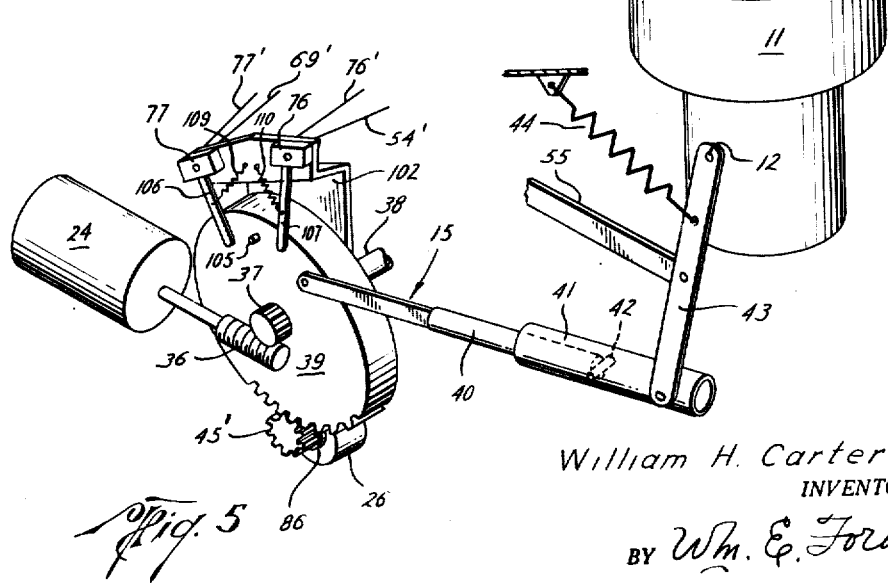
William H. Carter, Jr.
INVENTOR.

2,911,077

ELECTRICALLY ACTUATED SPEED CONTROL MECHANISM FOR ENGINES

William H. Carter, Jr., Houston, Tex., assignor to Nelson M. Brown, Austin, Tex.

Application January 17, 1956, Serial No. 559,711

11 Claims. (Cl. 192—3)

This invention relates to an improved speed control mechanism for engines of the type adapted to control the propulsion mechanism of a propelled body so that it travels at a substantially constant desired speed, regardless of the variations in forces opposing such constant speed travel. An example of such opposing forces in a motor vehicle would be the increase of momentum going down hill and the decrease of momentum due to overcoming gravity going up hill, Patent No. 2,671,542, issued March 9, 1954, to E. V. Robnett, Jr. for Speed Control Mechanism for Engines being a most illustrative example of this sub-class of invention.

In such type of mechanism the throttle or fuel feed valve is regulated for fuel flow by a motor actuator which is connected thereto by a linkage. A control valve controls a conduit from the suction manifold of the engine through which manifold suction as a force supplying means may be admitted to act upon the motor actuator, the control valve being urged against on one side by a governor driven by the fan belt and oppositely a mechanical means urges upon the control valve, such mechanical means being control actuated by a speed selector on the steering wheel post of the vehicle and being connected to the linkage between motor actuator and throttle valve in a manner that the movement of the linkage by the motor actuator operates the degree of its urging against the control valve.

In such a speed control the throttle setting responds to speed selector setting as it sets the mechanical means acting on the control valve oppositely of the governor and in direction of changing (slowing or speeding), and attains a temporary static setting in such direction deviating in substantial degree from the normal setting to achieve the indicated selector speed. At the same time the mechanical means connected to the selector which sets its operation will attain a setting or static operation in opposite direction from the speed change indicated by throttle setting, and deviating in substantial degree from the normal setting it must finally attain to achieve the selected speed. However, as the vehicle itself responds to throttle setting, it continues to approach the speed indicated by the speed selector, and from time to time the governor responds thereto and moves the control valve to admit manifold suction to move the actuator and throttle valve. The mechanical means is then operated by motor actuator movement until manifold suction cutoff again occurs and throttle setting and mechanical means setting again arrive at a static condition. Upon each occurrence the throttle valve and mechanical means setting approach nearer to settings corresponding with the settings which will be reached when the vehicle will be running over level ground at the selected speed.

Objection heretofore interposed to this type of speed control mechanism resides in the fact that where the force supplying means which supplies motivating force to the motor actuator is an engine developed force, the throttle setting shift in direction of any change of speed selected by the speed selector is augmented by the amplification of the engine developed force responsive to the change of engine speed over the ground as it responds to throttle setting change. Thus substantially longer running time is required to bring the vehicle to any selected speed than if the motivating force motivating the motor actuator is a force other than an engine developed force such as manifold suction, and a force lesser in degree than the force with which such an engine developed force acts upon the motor actuator when admitted thereto.

This invention sets out to avoid such objection by providing an improved speed control mechanism for engines in which the force supplying means for supplying a motivating force to the motor actuator setting the throttle valve is empowered independently of the engine. It thus avoids objections heretofore interposed to control mechanisms of this type operable responsive to such engine developed forces as lubricating system fluid pressure and engine manifold suction wherein the effective operation of the control mechanism is limited by the operation of these engine developed forces and subject to any inherent stoppages and failures thereof. As an example, by the provision of electric storage battery current as a force supplying means for supplying a motivating force to the motor actuator, it makes possible the provision of a speed control mechanism for Diesel driven trucks not having manifold suction as an engine developed force, and wherein operation by lubricating system fluid pressure would not be feasible.

It is consequently a primary object of this invention to provide an improved speed control mechanism for engines in which the force supplying means for supplying a motivating force to the motor actuator setting the engine throttle valve is empowered independently of the engine.

It is another object of this invention to provide an improved engine speed control mechanism of this class in which the provision of such a force supplying means empowered independently of the engine results in a control mechanism which may bring a vehicle to run at a selected speed within a shorter time interval than can be accomplished by similar mechanisms wherein the engine supplies such motivating force.

It is also an object of this invention to provide an improved speed control mechanism of this class in which the motor actuator for the propulsion mechanism of a propelled body has a motivating force suppled thereto which is empowered independently of the propulsion mechanism whereby such propulsion mechanism may be more rapidly brought to travel at a substantially constant, desired speed, regardless of variations in forces opposing such constant speed travel.

It is also another object of this invention to provide an improved engine speed control mechanism of this class in which the motor actuator for the engine is supplied with a motivating force empowered independently of the engine so that such mechanism may compensate for tendencies to change vehicle speed from any predetermined speed of travel by more rapidly restoring conditions attendant upon such desired speed travel than can be done in cases where the engine supplies such motivating force.

It is still another object of this invention to provide an improved engine speed control mechanism of this class in which the inherent failure, as by wear or breakage of a great number of the mechanical parts employed in prior art devices is eliminated by substituting for presently employed engine empowered motivating force supplying means to the motor actuator, such a means as an electric storage battery, empowered independently of the engine.

It is still a further object of this invention to provide an improved control mechanism of this class which may employ a conventional vehicle installation, as the brake fluid system, to disengage the control from normal vehicle operation, as when the brake is applied in emergency.

It is yet a further object of this invention to provide an improved control mechanism of this class which may be obviated, as when a speed above a set speed is desired, by the pressing of the standard vehicle accelerator pedal in emergency.

It is also an object of this invention to provide an improved control mechanism of this class which may promptly regain its control of the vehicle speed after having been obviated or disengaged by the emergency operation of standard vehicle installations.

It is also a further object of this invention to provide an improved control mechanism of this class which can be readily installed and calibrated on a wide variety of vehicles of varying construction and performance characteristics.

Other and further objects will be apparent when the specification is considered in connection with the drawings in which:

Fig. 1 is a perspective view of an automobile with parts removed to show the installation of the various combinations of elements comprising this invention;

Fig. 2 is a view, partially diagrammatic showing the operative relationship of such combinations of elements;

Fig. 3 is a diagrammatic view of the invention;

Fig. 4 is a perspective view of the speed control setting device as installed on the steering post of an automobile;

Fig. 5 is a perspective view of the engine fuel feed valve actuator and associated elements;

Fig. 6 is a chart showing the cycle of events occurring as the vehicle speeds up from one speed to approach another faster speed to which the speed control lever is moved to indicate; and Fig. 7 is a chart showing the cycle of events occurring as the vehicle slows down from one speed to approach a slower speed to which the speed control lever is moved to indicate.

Considering the general arrangement of the invention prior to making detailed reference to the drawings hereinabove described, the device may be described as substituting for the prior art control valve admitting and cutting off manifold suction to the motor actuator, a relay control unit admitting and cutting off battery current to a correspondingly electrically operated motor actuator which is linkage connected to the throttle valve. In place of the prior art governor, a fan belt driven tachometer generator generates alternating current which is rectified to direct current to be supplied to actuate the relay control unit. Furthermore, in place of the prior art mechanical means which acts on the prior art control valve oppositely of the governor, a rheostat graduated in correspondence with steering wheel post selector speed settings is control actuated by such settings and is in circuit with a shunt rheostat which is driven by motor actuator revolutions to change the current operating on the relay control unit.

Making reference to Figs. 1, 2, 4, and 5, the installation of the assemblies and sub-assemblies comprising the invention may be seen, and thereafter a more detailed description will be given as supplemented by description of Fig. 3 and the operation of the invention as graphically portrayed by the charts of Figs. 6 and 7.

An automobile 10 has a conventional carburetor 11 thereon including a conventional engine fuel feed valve indicated in Fig. 5 by a stem or shaft 12 which has connected thereto inside the carburetor 11 a valve plate which controls fuel flow to the engine 14 of the automobile of vehicle 10. A motor actuator assembly 15 is mounted under the hood 16 and on the engine 14 adjacent the carburetor and actuates the degree of opening of the valve 12, as will be explained in detail hereinbelow. An electric battery 17 is mounted in the vehicle at any desired and accessible position and by virtue of the electromotive force of its cells it is empowered independently of the vehicle engine 14 to supply a motivating force to motivate the actuator 15.

As best shown in Fig. 4, a speed selector assembly 28 is mounted on the steering post 29 and includes a housing 30 in which is journalled the shaft of a speed selector lever 31. The housing has graduations being equally radially spaced from the lever shaft axis to designate speeds at which it is desired to control the vehicle travel at uniformity.

A rheostat 33, not shown in Figs. 2 and 4, is shown in Fig. 3 and the resistor 34 of this rheostat is arcuate and is mounted within the selector speed housing 30 parallel with the graduations 32 on the housing exterior, the lever arm 31 being movable from graduation to graduation to set selected controlled speeds. Then when the vehicle runs the device of this invention is set in operation to bring the vehicle to the speed designated by the selected graduation. A conduit 35 shown in Fig. 1 encloses the circuit wires from the opposite ends of the resistor 34 and the circuit wire from the lever 31, and such conduit extends to the relay control unit 18 where the resistor wires are connected in a manner to be explained. On the other hand the wire from the lever extends from the relay control unit 18 via the conduit 27 to the shunt rheostat 26 to be connected as will be hereinbelow described.

The relay control unit 18 is located conveniently adjacent the battery 17 and preferably under the dashboard of the automobile, and such controls the flow of motivating force from the battery 17 to the actuator 15. A tachometer generator 19 is mounted on or adjacent to the automobile generator 20 and like the automobile generator it is driven by the fan belt 21 of the vehicle. Circuit wires to be hereinbelow described extend within a conduit 22 connecting the battery 17 to the relay control unit 18. Also circuit wires to be later described herein extend within a conduit 23 to a motor 24 comprising part of the motor actuator assembly 15, and other such circuit wires extend within a conduit 25 which connects the tachometer generator 19 to the relay control unit 18.

A shunt rheostat 26 forming part of the motor actuator assembly 15, but not shown in Fig. 1, is shown in Figs. 2, 3, and 5, and in manner to be hereinafter described, such shunt rheostat is connected to supply a force opposing the force exerted by the tachometer generator 19 on the relay control unit and operative through the motor actuator assembly 15 to change the speed of the vehicle by changing the rate of fuel flow in the carburetor 11. A conduit 27 contains therein the circuit wires which make connection between this shunt rheostat 26 and the relay control unit 18.

In cases where it is desired to increase the speed to a higher rate, the lever arm 31 is advanced to the higher speed desired and responsive to such increased setting the motor 24 of the motor actuator assembly 15 is controlled by the relay control unit 18, in a manner to be described in detail hereinbelow, so that motor 24 is rotated in direction to turn a worm 36 on the shaft of the motor to rotate a pinion 37 on an actuator shaft 38 in a clockwise direction as shown in Fig. 5 and to thereby drive a gear 39 on the shaft 38 also in a clockwise direction. A plunger 40 is pivotally connected at one end to the outer side face of the gear 39 and the other end of the plunger 40 is cylindrical to extend into a tubular sleeve 41. A cross-pin 42 has ends fitted into opposed bores in the sleeve wall and extends across the sleeve bore to act as a stop within the sleeve against which the plunger 40 is shown in abutment in Fig. 5.

A lever 43 is pivotally connected at one end to the sleeve 41 near the end thereof opposite the plunger 40 and at its other end the lever is rigidly connected, as by a press fit, to the outer end of the shaft of the fuel feed valve 12 of the carburetor 11. A spring 44 is connected at one end to a stationary element on the vehicle and the other end of the spring 44 is connected to the lever 43 intermediate the end connections thereof. It can thus be seen that if the gear 39 is driven in a clockwise direction as shown in Fig. 5, the plunger 40 is urged to the right to carry therewith the lower end of the lever 43 so that the shaft of the valve 12 connected to the upper end of the lever 43 pivots as it is journalled in the wall of the carburetor and thus the valve plate within the carburetor (not shown), is pivoted to increase the opening for fuel flow.

Conversely in cases where speed is to be decreased, as when the lever arm 31 is retarded to cut out shunt rheostat resistance by being rotated counter-clockwise in Figs. 2 and 4, the motor 24 drives the worm 36 in direction to drive pinion 37 and the gear 39 connected thereto in a counter-clockwise direction as viewed in Fig. 5 or a clockwise direction as viewed in Fig. 2. In this case the plunger 40 moves in direction to break contact with the cross-pin 42, but the spring 44 urges the lever arm 43 in direction to follow the recession of the plunger 40 with the consequence that the fuel valve shaft 12 is rotated in direction to close the fuel valve of the carburetor 11 and thereby engine speed is reduced.

A conventional ignition switch 46 and stop-light switch 48 shown in Fig. 3 are located in the dashboard of the vehicle and a push button switch 47 is located in the speed selector, see Figs. 1, 3 and 4. A conductor 51' shown in Fig. 3 extends from one side of the ignition switch 46 along within a conduit 51 shown in Fig. 1 to one terminal of the battery 17, the other battery terminal being grounded. From the other side of the ignition switch 46 a conductor 46' shown in Fig. 3 extends within a conduit 45, shown in Figs. 1 and 2, to the relay control unit 18 and therefrom such conductor 46' extends within the conduit 52 shown in Fig. 2, to the stop light switch 48 where normally contact is made to extend circuit through a conductor 47' to one contact of the push button switch 47. In Fig. 3 there is shown a relay 80 which operates the stop light switch 48, one terminal of the relay windings being grounded and from the other terminal thereof a conductor 80' extends to within the conduit 52 the relay control unit 18 and from thence within the conduit 92 in Figs. 1 and 2 to one side of the brake switch operated by the brake cylinder 50. From the other side of the brake switch the conduit 80' extends within the conduit 111 to the same side of the battery 17 as the point of connection of the conduit 51', and there battery connection is made.

From the contact of the push button switch 47 opposite its ignition switch connected contact, the conductor 47' extends within the conduit 35 to the relay control unit 18 and there is connected to one terminal of the windings of the relay 49, the other terminal of the windings being grounded. A switch 53 operated by the relay 49 is parallel connected across the push button switch 47 and thus when the ignition switch 46 is turned on and then the push button switch 47 on the speed selector is pressed the relay 49 is energized to close the switch 53 and thereafter the push button may be released and the relay 49 will remain energized as circuit continues completed through such switch 53. Also adjacent the relay 49 and operable thereby is a switch 54 which when closed cooperates in completing circuit to the motor 24 as will be hereinafter explained.

For a purpose to be hereinbelow described a conductor 59' within the relay control unit 18 connects to the conductor 47' between the relay 49 and the point of connection of the switch 53 to such conductor 47', and this conductor 59' leads therefrom to a contact of the normally open switch 59. From the opposite contact of such switch 59 a conductor 60' leads to one terminal of a relay 60, the other terminal thereof being grounded.

As the vehicle runs, its engine driven fan belt 21 in turn drives the tachometer generator 19. The power leads from the opposite sides of the tachometer generator 19 extend through the conduit 25 to the relay control unit 18 and are connected to the opposite sides of a conventional selenium rectifier 55 for converting alternating to direct current. From opposed terminals of the rectifier 55, located 90° from the tachometer generator connected terminals, power leads extend and have connected thereacross the windings of a relay 56. A conventional filter arrangement is provided in the form of a condenser 57, which is also connected across the power leads from the rectifier 55 and between such rectifier and the relay 56, and in parallel therewith.

One power lead extends from one side of the relay 56 within the conduit 35 between relay control unit 18 and speed selector 28, and is connected within the speed selector housing 30 to one end of the resistor 34 of the speed setting rheostat 33, see Figs. 2, 3 and 4. Such power lead thus includes therein part of the resistance of the resistor 34,, and the selector arm 31. From such selector arm 31 the power lead extends as conductor 31' via the conduit 35 back to the relay control unit 18 and from thence via the conduit 23 to the motor actuator 15. The part of the resistance of the resistor 34 not in this first power lead is placed in parallel with the circuit of the relay 56 and the circuit of the condenser 57 across the power leads by means of the conductor 34' which is connected to the end of the resistor 34 opposite the first power lead and extends therefrom within the conduit 35 to the relay control unit 18 where it is connected to the second power lead, which in turn extends via the conduit 23 to the motor actuator assembly 15.

At the motor actuator assembly 15 the resistor 98 of the shunt rheostat 26 is connected to the first power lead 31', and a circuit across the power leads parallel to the circuits of the relay 56, condenser 57, and the parallel connected part of the resistor 34, is completed by the part of the resistor 98 cut in by an arm 86, fixed on the shaft of the pinion 45' and rotatable therewith, and including the arm 86, from which the conductor 100 extends to the second power lead. Finally a fifth circuit across the power leads, parallel to the four parallel circuits hereinabove described, is completed to include the windings of the sensitive relay 58.

The sensitive relay 58 has mechanically mounted on its armature shaft an arm 78 which is grounded at 93, and hair springs 79 on the ends of the shaft urge the arm into contact with the contact 71 and away from the contact 72, such arm being shown short of such contact in Fig. 3. From the contact 71, a conductor 71' extends via the conduit 23 to the relay control unit 18 and therein such lead connects to one contact of the switch 61 which is shown open in Fig. 3, the switch 61 in turn being connected in series with the normally open switch 54. From the normally open contact of this switch 54 a conductor 54' extends through a conduit 91, shown in Fig. 1, to a limit switch 76 at the motor actuator 15 (see Fig. 5), the mechanical operation of such limit switch to be described hereinbelow. A return lead or conductor 76' extends within the conduit 91 back to the relay control unit 18 where it has series connected thereinto the windings of a relay 74 and from thence extends within the conduit 22 to the battery 17 where connection is made on the same side of the battery as the ignition switch connection line 51' is connected.

The voltage generated by the tachometer generator 19 sends current to energize relay 56 to close switch 59. Switch 60 is thus energized to close switches 61 and 69. This completes circuit from ground 93, through arm 78, contact 71 conductor 71', switch 61, switch 54, limit switch 76, and relay 74 to conductor 51' and battery 17, and the energizing of relay 74 closes switches 81, 82, and 83 in the relay control unit 18. The closing of switch 81 completes a circuit from ground, and a control resistor 94 for the motor 24, through its windings 85, the conductor 96 which extends within the conduit 23 shown in Figs. 1 and 2 to the relay control unit 18 and therein circuit extends through the switch 81 and a cooperating switch 89, to a conductor 97, which connects to the conductor 76', and completion is made through the conductor 51' to the battery 17.

The limit switch 77 is located at the motor actuator 15 (see Fig. 5), and its operation will be described hereinbelow in detail. A lead or conductor 69' thereto from the switch 69 extends within the conduit 99 from the relay control unit to the motor actuator 15, and return from the opposite side of such limit switch is made by the conductor 77'.

When relay 75 is energized switches 87, 88, and 89 are closed from the normally open positions shown in Fig. 3, and circuit is established from ground, through resistor 94, to the motor winding 85, and from thence through conductor 96, switch 87, switch 81, conductor 97 conductor 76', and conductor 51' to the battery 17. Also circuit is established from ground 90, switch 83, switch 89, conductor 89', motor winding 84, conductor 83', conductor 88', switch 88, switch 82, conductor 97, conductor 76', and conductor 51' to the battery 17. With the motor windings thus energized, the motor 24 will be driven in direction to close throttle 12 with the consequent shifting of the arm 78, as urged by the spring 79 in opposition to the sensitive relay 58, to bear against the contact 71 as will be hereinbelow described.

In reiteration the shunt rheostat 26 shown diagrammatically in Fig. 3, is of round construction, as shown in Fig. 5, and is rotated with the pinion 45'. Its resistor 98 shown in Fig. 3, is of conventional arcuate shape mounted concentrically with the axis of the pinion 45' and is stationarily supported with relation thereto, while the arm 86 of the shunt rheostat 26 is rotatable with the pinion 45' and thus as it rotates in contact with the resistor in one direction it cuts in more and more resistance and when rotated oppositely it cuts out resistance.

Making reference to Figs. 1–5, and also considering the chart of Fig. 6, let it be assumed that a vehicle not controlled by this invention is going over the ground at a speed of say 30 miles per hour and that it is desired to attain a controlled running speed of say 40 miles per hour. The push button 47 is pressed to energize relay 49 to throw switches 53 and 54, closure of the switch 59 being effected by the relay 56 as energized by revolution of the tachometer generator 19. The lever 31 of the speed selector is now set to a graduation 32 to cut in resistance into the power line and out of the parallel connected part of the resistor 34, as would be indicated in Fig. 3 by movement of the arm 31 in direction of the letter F and away from the letter S. Less current now flows through the shunt rheostat resistor 98 and through the windings of the sensitive relay 58 and consequently the force of the hair springs 79 may overcome the rotational force operative on the armature shaft of the relay 58 and rotate the arm 78 into contact with the contact 71.

The closure of the switch 59 has completed circuit to the relay 60 which has thrown switches 61 and 69, and circuit is now complete to the relay 74 which throws switches 81, 82, 83 to complete circuit to the windings 84, 85 to the motor 24 and the motor now drives the motor actuator assembly 15 in direction to open throttle setting of the carburetor 11 to increase fuel feed while at same time the shunt rheostat arm 86 is rotated in direction of the letter F in Fig. 3 and away from the letter S to cut more resistance into the shunt rheostat circuit. This increases the current flowing in the winding of the sensitive relay 58 until a point is reached at a in the chart of Fig. 6 where the throttle setting may be that equivalent to a speed of say 55 miles per hour at which point the relay 58 develops force to overcome hair spring tension and break contact between the arm 78 and contact 71. This stops the motor as the de-energized relay 74 opens switches 81, 82, and 83 and motor stoppage discontinues throttle movement and rotation of arm 86.

As the current in the windings of the relay 58 increases, the arm 78 is drawn toward contact 72 until at a point c on the throttle setting curve of the chart the arm makes such contact 72 and circuit is completed through relay 75 so that it closed switches 87, 88 and 89 and completes circuit to the motor windings 84, 85 to drive the motor in direction to close the throttle and to rotate the shunt rheostat arm 86 in direction to cut out resistance and thereby decrease the current flowing in the windings of the relay 58. This decrease continues until a point e is reached on the throttle setting as plotted on the chart of Fig. 6 where the tension of the hair springs 79 overcomes the force of the relay 58 and rotates the arm 78 out of the engagement with the contact 72.

This stops the motor as the de-energized relay 75 opens switches 87, 88, and 89 and such motor stoppage discontinues throttle movement and rotation of the arm 86. There follows a period ending at g when the stored tension in the hair springs 79 may carry the arm 78 over into contact with the contact 71 to again start the motor 24 in direction to increase throttle while at the same time rotating the arm 86 in direction to cut more resistance into the shunt rheostat circuit. The cycle hereinabove described will then be generally repeated as shown, beginning at g to a on the curve of Fig. 6.

During the above described throttle setting changes the speed of the engine over the ground continues to increase and the momentum of the vehicle causes changes in rate of increase corresponding to the cyclic changes in throttle setting to lag these cyclic changes in point of time. Thus from point b to d on the engine speed curve the slope of increase is less than from beginning to point b in correspondence with the stoppage of throttle movement from a to c and then from points d to f the rate of increase is still less in correspondence with the decrease of throttle setting from points c to e on the throttle setting curve. Correspondingly there is again an increase from f to h in the slope of the engine speed curve over the immediately preceding rate from d to f, as engine speed follows the stabilized throttle setting plotted from e to g.

When the vehicle changes from a slower speed to a predetermined faster speed, the tachometer generator output voltage increases with engine speed more current flows in the parallel circuits hereinabove described, and thus in each cycle there is an increased amperage flowing in the windings of the relay 58 to create rotative force to act upon the relay armature shaft in opposition to the rotative force exerted thereon by the hair springs 79. Thus in each cycle the period of throttle increase as from g to a will be of shorter duration and the period of throttle decrease, as from c to e, will be of longer duration, see Fig. 6.

A converse relation is shown in plot on the chart of Fig. 7 which plots the conditions when an engine not controlled by this invention is running over the ground at a speed of say 60 miles per hour and when it is desired to attain a controlled running speed of say 50 miles per hour. In such case the lever arm 31 is set at that graduation 32 calibrated 30 to cut out resistance from the power line and into the circuit containing the parallel connected part of the resistor 34, as would be indicated in Fig. 3 by movement of such lever arm 31 in direction of the letter S and away from the letter F. More current now flows through the shunt rheostat resistor 98 and through the windings of the sensitive relay 58 and consequently the increased current may overcome the rotational force exerted on the sensitive relay armature shaft by the hair springs 79, and bring the arm 78 in contact with the contact 72.

The pressing of the push button 47 may now complete circuit to the relay 75 which throws the switches 87, 88 and 89 to close circuit to the motor windings 84, 85 of the motor 24 and the motor runs to decrease throttle setting and at the same time the shunt rheostat arm 86 is rotated in direction of the letter S to cut out resistance from the shunt rheostat circuit. This decreases the current flowing in the winding of the relay 58 so that the force opposing the force of the hair springs 79 is weakened and the hair spring force takes over and moves the arm 78 to break contact at 72. Considering the chart of Fig. 7, the point of breaking contact is indicated at point $a$ on the throttle setting curve, the throttle by this time having attained a setting corresponding to an uncontrolled running speed of say 35 miles per hour.

As throttle movement is discontinued and also movement of the shunt rheostat arm 78 is stopped, the relay 75 is de-energized and the switches 87, 88 and 89 are thrown to off position. The engine speed over the ground now begins to decrease responsive to lowered throttle setting with the consequent decrease in tachometer generator output and lowering of current flowing in the winding of the relay 58 so that the hair springs 79 may now urge the arm 78 against the contact 71, such occurrence being indicated at the point $c$ on the curve of throttle setting.

As contact between the arm 78 and the contact 71 is established, the motor 24 runs as has been hereinabove described to increase throttle setting and at the same time to rotate the shunt rheostat arm 86 in direction toward the letter F in Fig. 3 to cut more resistance into the shunt rheostat circuit and thereby increase the current flowing in the winding of the sensitive relay 58.

The current in the windings of the relay 58 now builds up force to exceed the tension of the hair springs 79 and the contact of the arm 78 with contact 71 is broken as indicated at point $e$ in the curve of Fig. 7. The relay 74 is consequently de-energized and the switches 81, 82, 83 are thrown to off position and the motor 24 is stopped as has been described hereinabove. There results the consequent stoppage of the motor 24 and with it throttle movement and movement of the arm 86.

The impulse of current increase in the winding of the relay 58 is enough after breaking contact at 71 to carry the arm 78 over to the contact 72, the point $g$ indicating this occurrence on the throttle setting curve of the chart of Fig. 7. The cycle hereinabove described will then generally be repeated as shown, beginning at $g$ to $a$ on the curve of Fig. 7.

During the above described throttle setting changes, the speed of the engine over the ground decreases but the momentum of the vehicle causes changes in rate of decrease corresponding to the cyclic changes in throttle setting and these changes lag the cyclic throttle speed changes in point of time. Thus from the point $b$ to $d$ on the engine speed curve the slope of decrease is less than from beginning to point $b$ while for example the points $b$ and $d$ occur later in time than the corresponding points $a$ and $c$ on the throttle setting curve. From $d$ to $f$ on the engine speed curve the rate of decrease is still less in correspondence with the increase of throttle setting from points $c$ to $e$ on the throttle setting curve. Correspondingly there is again an increase from $f$ to $h$ in the slope of the engine speed curve over the immediately preceding rate from $d$ to $f$, as engine speed follows throttle setting as plotted from $c$ to $g$.

When a vehicle changes from a faster speed to a predetermined slower speed, the tachometer generator output voltage decreases with engine speed and less current flows in the parallel circuits hereinabove described, and thus in each cycle there is a decreased amperage flowing in the windings of the relay 58 to create rotative force to act upon the relay armature shaft in opposition to the rotative force exerted thereon by the hair springs 79. Thus in each successive cycle the period of throttle decrease, as shown $g$ to $a'$ in Fig. 7 will be of shorter duration and the period of throttle increase, as from $c'$ to $e'$ in Fig. 7, will be of longer duration.

In a vehicle running over the ground at a certain speed there is an inherent momentum therein resisting a change to a lower speed and an inherent inertia therein resisting a change to a higher speed.

For this reason the selector speed rheostat 33 and the shunt rheostat 26 are so designed with relation to each other and with relation to the sensitive relay 58, the motor 24, the mechanism of the motor actuator unit 15, and its linkage to the carburetor fuel valve 12, that a certain movement of the selector speed lever arm 31, as from a graduation representing 30 miles per hour to a graduation representing 40 miles per hour, will cause a movement of the throttle valve which would correspond with the throttle position at which the vehicle would attain a level ground running speed in some substantial excess of the 10 mile per hour change sought. In the illustrative charts of Figs. 6 and 7 the throttle position to which the throttle is initially moved for a 10 mile per hour change of speed is a position shown corresponding to a 25 mile per hour change of speed, and thus the ratio of initially attained throttle movement to desired throttle setting change is 5 to 2 as an example illustrating this feature.

With such a ratio the throttle "overshoots" its desired ground level speed position in the direction of change from a present speed to such desired speed. Then by way of compensation the motor operates the shunt rheostat to create condition causing a discontinuation of motor rotation driving the throttle in the direction of the desired change and following thereafter a reversal of motor rotation takes places to operate the shunt rheostat to create condition driving the motor to shift the throttle to tend to cause velocity change in the opposite direction.

Thus a condition is created whereby the vehicle due to its status in momentum or inertia continues to approach speed equivalent to the desired predetermined speed, whereas the throttle setting in successive cycles tends to recede from its initial "overshot" position, to a setting approaching the predetermined speed as selected by the selector arm 31. Consequently, the vehicle is rapidly brought to the selected speed in a very few of the cycles hereinabove described and when at selected speed on a substantially level road the arm 78 is held substantially static between the contacts 71 and 72, the hair springs 79 not having enough torsional force therein to move the arm 78 to contact 71 and the force developed by current flow through the windings of the relay 58 not being enough to move the arm 78 to the contact 72.

However, should the engine start up hill the tachometer generator out put voltage is reduced and consequently the current in the windings of the relay 58 so that the hair springs 79 pull the arm 78 against the contact 71 to start the motor 24 to open the carburetor fuel valve 12 to increase throttle to overcome the retardation of inertia or gravity on the vehicle. The contact remains closed until the arm 86 is driven to cut in more resistance 98 and thereby increase current flowing in the windings of the relay 58. On the other hand, when a vehicle going at a selected speed may start down hill, the increased tachometer generator output voltage increases current flow in the windings of the relay 58 to draw the arm 78 against contact 72 to run the motor 24 in direction to decrease throttle setting, the contact 72 remaining closed until the arm 86 is driven to cut out resistance 98 and thereby decrease current flowing in the windings of the relay 58.

In case it may become necessary to apply the brake of the vehicle shown in Fig. 1 when it is under control of this invention, the brake pedal 101 is pressed to operate in conventional manner as by forcing the stem of the brake pedal downwardly and forwardly to pivot the pivot link 109 which is pivotally mounted centrally thereof on the vehicle frame. This moves the piston rod 110 and the piston thereon (not shown but operable in the brake cylinder 50), to move such piston rearwardly and force lubricating fluid in the conventional lubricating fluid system, not shown, to set the brakes. As is done conventionally this closes the brake switch to complete circuit via the conductor 80' through the relay 80 to throw the stop light switch 48 to lower position as shown in Fig. 3, thereby opening circuit between the conductors 46' and 47' while closing circuit to the conventional stop light circuit, now shown. This breaks circuit to the relays 60 and 49 so that the switches 61, 69, 53, and 54 are thrown. Circuit to the windings of relay 75 continues complete however and the motor runs in direction to reduce throttle. This is accomplished as now circuit from the ground 108 is completed through switch 69 and conductor 69' to the limit switch 77 and thence through conductor 77' to the windings of the relay 75 and thence through conductor 76' and conductor 51' to the battery 17. The switches 87, 88, and 89 thus remain closed by the relay 75 and circuit is complete to the windings 84, 85 of the motor 24.

In case it may be desired to speed up and override a selected speed at which the vehicle may be traveling under control of the invention, the accelerator pedal 62 is pressed. The stem of the pedal 62 is pivotally connected to the rearward end of the lever 66 and to the upper end of the L-shaped lever 63 which has its lower end pivotally connected to the frame of the vehicle. The forward end of the lever 66 is in turn pivotally connected to the lower end of the linkage 55, which is of L-shape and has its upper end pivotally connected to the lever 43 between the spring 44 and the sleeve 41. Normally a spring 64 is connected at its lower end to the lever 66 intermediate its ends and at its upper end to the frame to urge the lever 66 rearwardly and the accelerator pedal 62 upwardly. Thus when pressure on the accelerator pedal 62 is exerted against force of the spring 64 to urge the lever 66 forwardly, the linkage 55 is urged to the left as viewed in Figs. 1 and 2, or to the right as viewed in Fig. 5, and the arm 43 is rotated in direction to open the throttle valve 12.

In this case the arm 43 carries with it the sleeve 41 and draws the pin 42 out of contact with the plunger 41. The vehicle is thereby driven at an accelerated speed in excess of the selected speed as long as the accelerator is pressed, and only upon release of the accelerator is control restored. In this case on spring 67, having one end connected to the frame of the vehicle and the other end connected to the lever or linkage 66, urges the lever 66 to the right as viewed in Fig. 1, and the accelerator sleeve 63 and pedal 62 are urged upwardly. At the same time the spring 44 urges the lever 43 to the right as viewed in Fig. 2 or to the left as viewed in Fig. 5 and restores abutment of the pin 42 with the plunger 40.

The limit switches 76 and 77 are provided to define the respective upper and lower speed limits at which the control of this invention is to be effective. As shown in Fig. 5 the limit switches 76 and 77 are pivotally mounted on a bracket 102 which provides the journal for the hub 38 or the gear 39 and pinion 37. As the gear 39 is driven by the motor 24 to reduce the throttle setting the pin 105 on the gear 39 is moved to the left until it contacts the arm 106 of the limit switch 77 to cause it to shift on its pivot and thereby break connection between the conductors 69', 77'. This de-energizes the relay 75 and the switches 87, 88, and 89 are opened and the motor 24 is stopped.

When the motor 24 is driven in direction to increase throttle setting to the upper limit of effectiveness of the invention, the pin 105 contacts the arm 107 of the limit switch 76 and causes it to shift on its pivot and thereby break connection between the conductors 54 and 76. This breaks circuit to the windings of the relay 74 and it is de-energized and throws switches 81, 82, 83, to break circuit to the windings 84, 85 of the motor 24 and the motor is stopped.

In cases where the upper or lower limiting speed of the control is reached and then the gear 39 is rotated oppositely and the pin 105 is rotated out of abutment with either the arm 106 or the arm 107, respective springs 109 and 110 extend between the arms and the bracket 102 to return the limit switches to circuit completing position.

The hair springs 79 are shown in Fig. 3 positioned to exert torsion one to turn the rotor of the relay 58 in one direction and the other to exert torsion to turn the rotor in the other direction. The tension of the hair springs 79 are then varied by conventional adjustment means not shown so that the resultant force urges the arm 78 toward the contact 71 in degree calibrated with the other functional characteristics of the fuel valve, its actuator, and the shunt rheostat.

The invention admits various means of exerting torsion on the rotor of the relay 58 other than by hair springs 79 and as a matter of fact the overall structure encompasses a variety of embodiments, any arrangement serving which may actuate the fuel valve in opening and closing direction being included, and any force supplying means serving which may perform in correspondence with a battery, as long at it is a means empowered independently of the engine. Also any means may serve corresponding to a sensitive relay to set in motion the force moving the actuator and a variety of engine speed responsive means may serve for the tachometer generator as well as may serve a range of structures to act as the shunt rheostat as driven by the actuator in opposition to the tachometer generator or its equivalent.

The invention therefore is not limited to the specific structures disclosed and a variety of other structures are considered as such may fall within the broad spirit of the invention and within the broad scope of interpretation claimed and merited for the appended claims.

What is claimed is:

1. An engine speed control including an engine fuel feed valve, an actuator therefor, an engine speed responsive means, a control circuit to which current is supplied by said engine speed responsive means and including in parallel a shunt rheostat and a circuit shifting device, a battery empowered motor with direction reversing circuit means and adapted to drive said actuator in one direction to increase current flow from said engine speed responsive means to said control circuit and to increase shunt rheostat resistance, and adapted to drive said actuator in the other direction to decrease current flow from said engine speed responsive means to said control circuit and to decrease shunt rheostat resistance, and means empowered independently of said engine to oppose said circuit shifting device in its shifting of said reversing circuit means.

2. An engine speed control comprising an engine speed responsive means, a control circuit connected thereto including in parallel relay windings and a shunt rheostat, a battery, a motor, an engine fuel feed valve, an actuator connected to be driven by said motor and to control said engine fuel feed valve and said shunt rheostat, a first circuit connecting said battery to drive said motor in direction to drive said actuator toward closing said engine fuel feed valve and reducing shunt rheostat resistance, a second circuit connecting said battery to drive said motor in direction to drive said actuator toward opening said engine fuel feed valve and increasing shunt rheostat resistance, said control circuit including circuit shifting means including means operable responsive to current increase in said relay windings and biasing means opposed thereto to respectively close said first and second circuits.

3. An engine speed control tending to maintain a motor vehicle running at selected speeds and comprising a control circuit including in parallel relay windings and a shunt rheostat, a battery, a motor, an engine fuel feed valve, an actuator connected to be driven by said motor in one direction toward opening and in the opposite direction toward closing said engine fuel feed valve, said actuator also being connected to operate said shunt rheostat to change resistance, a first circuit connecting said battery to drive said motor in said one direction and a second circuit connecting said battery to drive said motor in the opposite direction, said control circuit including circuit shifting means biased toward closing said first circuit and operable responsive to the increase of current flowing in said relay windings to overcome said bias and close said second circuit, an engine speed responsive means connected to supply current through said shunt rheostat and said relay windings whereby increase in the current overcomes said bias to close said second circuit so that said motor is driven toward closing said engine fuel feed valve and to reduce shunt resistance thereby reducing relay windings current to break said second circuit, and whereby upon decrease in the current supplied said first circuit is biased closed and said motor is driven toward opening said engine fuel feed valve and to increase shunt resistance thereby increasing relay winding current to break said first circuit.

4. An engine speed control tending to maintain a motor vehicle running at selected speeds and comprising in parallel circuits relay windings and a shunt rheostat, a battery, a motor, an engine fuel feed valve, an actuator connected to be driven by said motor and to control said shunt rheostat and said engine fuel feed valve, a biasing means, an engine speed responsive means to supply current to said parallel circuits, a first circuit closed by urging of said biasing means upon decrease of current supplied by said engine speed responsive means, said first circuit connecting said battery to drive said motor to operate said actuator toward opening said engine fuel feed valve and to increase shunt resistance thereby increasing relay windings current to break said first circuit, and a second circuit closed upon increase of current supplied by said engine speed responsive means to overcome said biasing means, said second circuit connecting said battery to drive said motor to operate said actuator toward closing said engine fuel feed valve and to reduce shunt resistance thereby reducing relay windings current to break said second circuit.

5. An engine speed control comprising an engine speed responsive means, in parallel circuits relay windings and a shunt rheostat, an engine fuel feed valve, an actuator connected to be driven by said motor and to control said engine fuel feed valve and said shunt rheostat, a first circuit connecting said battery to drive said motor in direction to drive said actuator toward closing said engine fuel feed valve and reducing shunt rheostat resistance, a second circuit connecting said battery to drive said motor in direction to drive said actuator toward opening said engine fuel feed valve and increasing shunt rheostat resistance, circuit shifting means including means operable responsive to current increase in said relay windings and biasing means opposed thereto to respectively close said first and second circuits.

6. An engine speed control including an engine fuel feed valve, a control means, an actuator connected to operate said valve and said control means, a force applying means empowered independently of said engine and adapted to supply a motivating force to said actuator, an engine speed responsive means, a pair of connection means connectable one at a time to said force applying means, a biasing means, a pair of contactors one with contacting force increased responsive to increase of force supplied thereto by said engine speed responsive means and the other with contacting force derived from said biasing means, with one connection means connecting said force applying means driving said actuator toward closing said engine fuel feed valve and operating said control to oppose increase of force supplied to said contactor by said engine speed responsive means, whereby to break contact with said one connection means, and with the other connection means connecting said force applying means to the other contactor said force applying means driving said actuator toward opening said engine fuel feed valve and operating said control to increase force supplied to said other contactor whereby to break contact with said other connection means.

7. An engine speed control including an engine fuel throttle, an engine speed responsive means, parallel circuits to which current is supplied by said engine speed responsive means one including a shunt rheostat and the other including a circuit shifting device, an actuator for said throttle and said shunt rheostat, a battery empowered motor with direction reversing circuit means to drive said actuator in one direction to increase throttle and shunt resistance, and adapted to drive said actuator in the other direction to decrease throttle and shunt resistance, and means empowered independently of said engine to oppose said circuit shifting device in its shifting of said reversing circuit means.

8. A speed control for a motor vehicle including an engine fuel feed valve, an engine speed responsive means, parallel circuits to which current is supplied by said engine speed responsive means, one including a shunt rheostat and the other including a circuit shifting device, an actuator for said valve and for said shunt rheostat, a battery empowered motor with direction reversing circuit means to drive said actuator in one direction to increase valve opening and shunt resistance, and adapted to drive said actuator in the other direction to decrease valve opening and shunt resistance, and means to oppose said circuit shifting device in its shifting of said reversing circuit means.

9. A speed control as claimed in claim 8 in which said force supplying means drives said actuator in direction to close the fuel valve when said vehicle is braked.

10. A speed control as claimed in claim 8 in which the pressing of the accelerator pedal actuates said fuel valve exclusively of said actuator.

11. A speed control as claimed in claim 8 in which said force supplying means connection includes upper and lower limit switches operable by said actuator respectively at the upper and lower range of speed control to discontinue the operation of said force supplying means.

References Cited in the file of this patent

UNITED STATES PATENTS

| | | |
|---|---|---|
| 1,345,539 | Fynn | July 6, 1920 |
| 1,820,272 | Gumpper | Aug. 25, 1931 |
| 2,204,492 | Heintz | June 11, 1940 |
| 2,313,505 | Benjamin | Mar. 9, 1943 |
| 2,661,071 | Hoener | Dec. 1, 1953 |
| 2,671,542 | Robnett | Mar. 9, 1954 |